(12) United States Patent
Gu

(10) Patent No.: US 11,597,460 B1
(45) Date of Patent: Mar. 7, 2023

(54) BICYCLE WHEEL POSITIONING DEVICE

(71) Applicant: Haidong Gu, Pomona, CA (US)

(72) Inventor: Haidong Gu, Pomona, CA (US)

(73) Assignee: CYCLINGDEAL USA, INC., Pomona, CA (US)

( * ) Notice: Subject to any disclaimer, the term of this patent is extended or adjusted under 35 U.S.C. 154(b) by 25 days.

(21) Appl. No.: 17/402,587

(22) Filed: Aug. 15, 2021

(51) Int. Cl.
*B62H 3/08* (2006.01)
*F16M 13/02* (2006.01)

(52) U.S. Cl.
CPC ............... *B62H 3/08* (2013.01); *F16M 13/02* (2013.01)

(58) Field of Classification Search
CPC .... B62H 3/04; B62H 3/08; B62H 3/12; A47L 13/51; F16M 13/02
See application file for complete search history.

(56) References Cited

U.S. PATENT DOCUMENTS

| 661,677 | A | * | 11/1900 | Taylor | B62H 3/00 211/20 |
|---|---|---|---|---|---|
| 4,802,594 | A | * | 2/1989 | Graber | B62H 3/00 211/20 |
| 4,830,167 | A | * | 5/1989 | Lassche | B62H 3/00 70/225 |
| 2022/0234667 | A1 | * | 7/2022 | Robinson | B62H 3/08 |

* cited by examiner

*Primary Examiner* — Terrell L McKinnon
*Assistant Examiner* — Jerry Olivier

(57) ABSTRACT

A bicycle wheel positioning device includes a case and two positioning units. The two positioning units are respectively installed to the case and each include a roller unit and at least one spring. When the two roller units are applied by a force, the two roller units are pushed away from each other. When the force is removed, the roller units move back and toward each other by the at least one spring in each roller unit.

9 Claims, 14 Drawing Sheets

BICYCLE WHEEL POSITIONING DEVICE

BACKGROUND OF THE INVENTION

1. Fields of the Invention

The present invention relates to a positioning device, and more particularly, to a positioning device fixed to a stationary object so as to position a bicycle wheel.

2. Descriptions of Related Art

There are different types of wall mounts that are designed to positioning a bicycle so as to save storage space in a garage. Compared with the conventional parking racks, they are smaller in size and generally installed on the wall to save the occupancy to the utmost extent. For example, Taiwanese Patent No. M493340 discloses a tool fixing clip structure which is originally used to clamp rods and not specifically designed for bicycles, however, many people use this type of products to position bicycles. After being fixed on the wall, when the wheel passes through two clamping parts, the elastic cantilevers on both sides are pushed apart from each other. When the wheel rim passes through the two clamping parts, the elastic cantilever on both sides will rebound due to its own elastic feature to restrict the wheel rim from disengaging from the clamping parts. However, the resilience of the elastic cantilever will gradually decrease as the number of uses increases. The initial distance between the two clamps will become wider and wider, and then gradually fails to well position the rim from detaching. Then the users can only to purchase a new one to replace it, as this type of product is not intended to store bicycles.

The present invention intends to provide a bicycle wheel positioning device to eliminate shortcomings mentioned above.

SUMMARY OF THE INVENTION

The present invention relates to a bicycle wheel positioning device and comprises a case that includes a back board, two first boards and two second boards, wherein the two first boards respectively extend from the top and the bottom of the back board, and the two second boards extend from two ends of the back board and are connected to the two first boards. A room is formed between the back board, the two first boards and the two second boards. The case includes an opening formed to the front of the case and communicates with the room. Each of the two first boards includes a recess which communicates with the opening and the room.

Two positioning units are respectively and connected to two second boards. Each positioning unit includes a roller unit and at least one spring. The two respective roller units are located in the room. When a force is applied to the two roller units in a direction toward the two roller units, the at least one spring of each roller unit is compressed and the two roller units are resiliently moved away from each other. When the force is removed, the at least one spring of each roller unit rebounds and the two roller units move toward each other.

The movement of the roller units are made by the two respective springs so that the springs can be replaced instead replacement of the whole positioning units.

The two positioning units are two individual units which can be replaced individually when needed.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Figure 1:
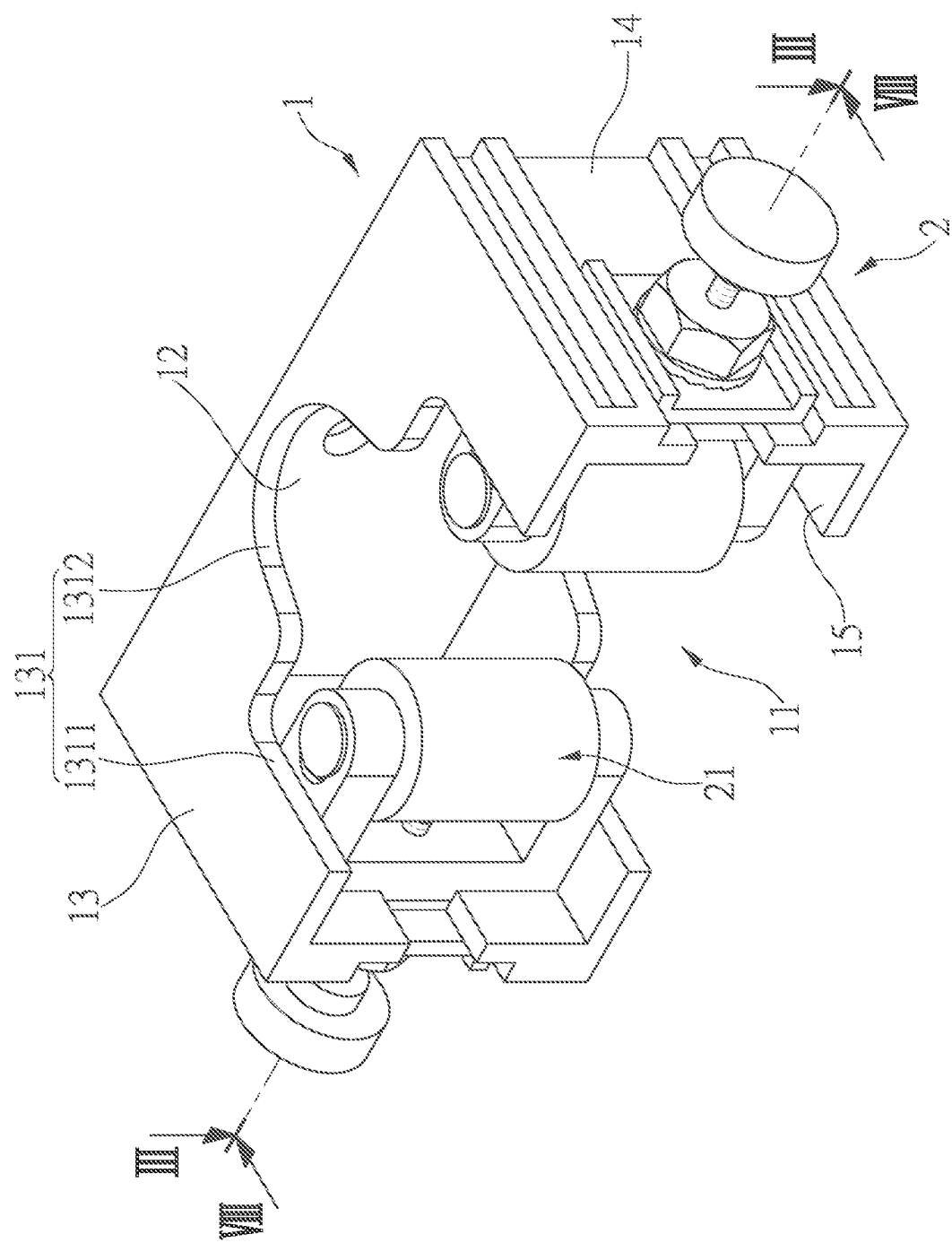
FIG. 1 is a perspective view to show the positioning device of the present invention.

Referring to FIGS. 1 to 8, the positioning device of the present invention comprises a case 1 including a back board 12, two first boards 13 and two second boards 14. The two first boards 13 respectively extend from the top and the bottom of the back board 12. The two second boards 14 respectively extend from two ends of the back board 12 and are connected to the two first boards 13. A room 11 is formed between the back board 12, the two first boards 13 and the two second boards 14. In addition, the case 1 includes an opening 15 formed to the front of the case 1 and communicates with the room 11. Each of the two first boards 13 includes a recess 131 which opens to the front of the case 1 and communicates with the opening and the room 11. Two positioning units 2 are respectively connected to two second boards 14. Each positioning unit 2 includes a roller unit 21 and two springs 24. The two respective roller units 21 are located in the room 11. When a force is applied to the two roller units 21 in the direction toward the two roller units 21, for example, a bicycle wheel 100 is inserted between the two roller units 21, the two springs 24 of each roller unit 21 are compressed and the two roller units 21 are resiliently moved away from each other. When the force is removed, force example, the bicycle wheel 100 pass the two roller units 21, the two springs 24 of each roller unit 21 rebound and the two roller units 21 move toward each other and to their initial positions.

Figure 4:
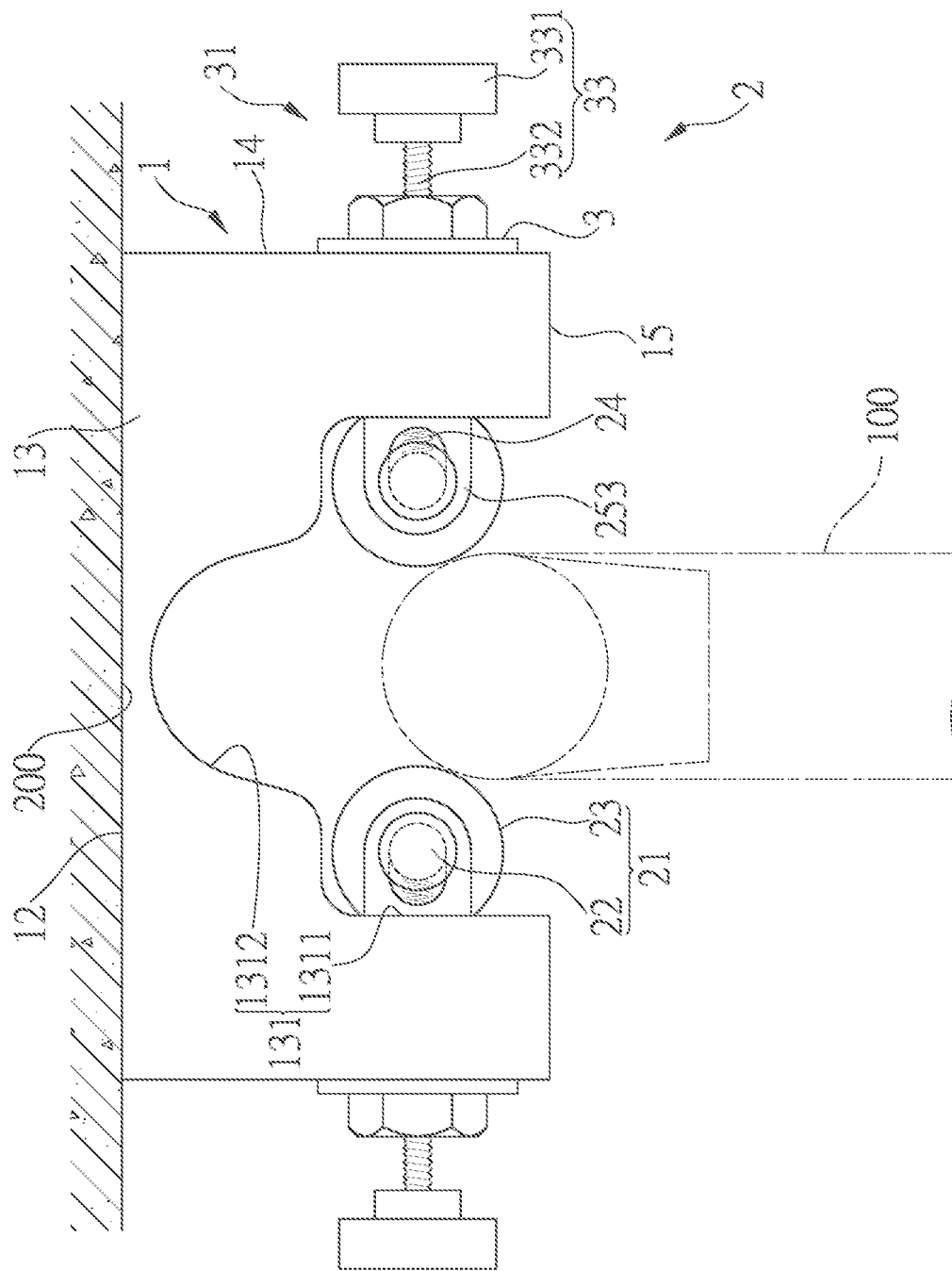
FIG. 4 shows that a bicycle wheel is to be inserted between the two roller units.
Figure 5:
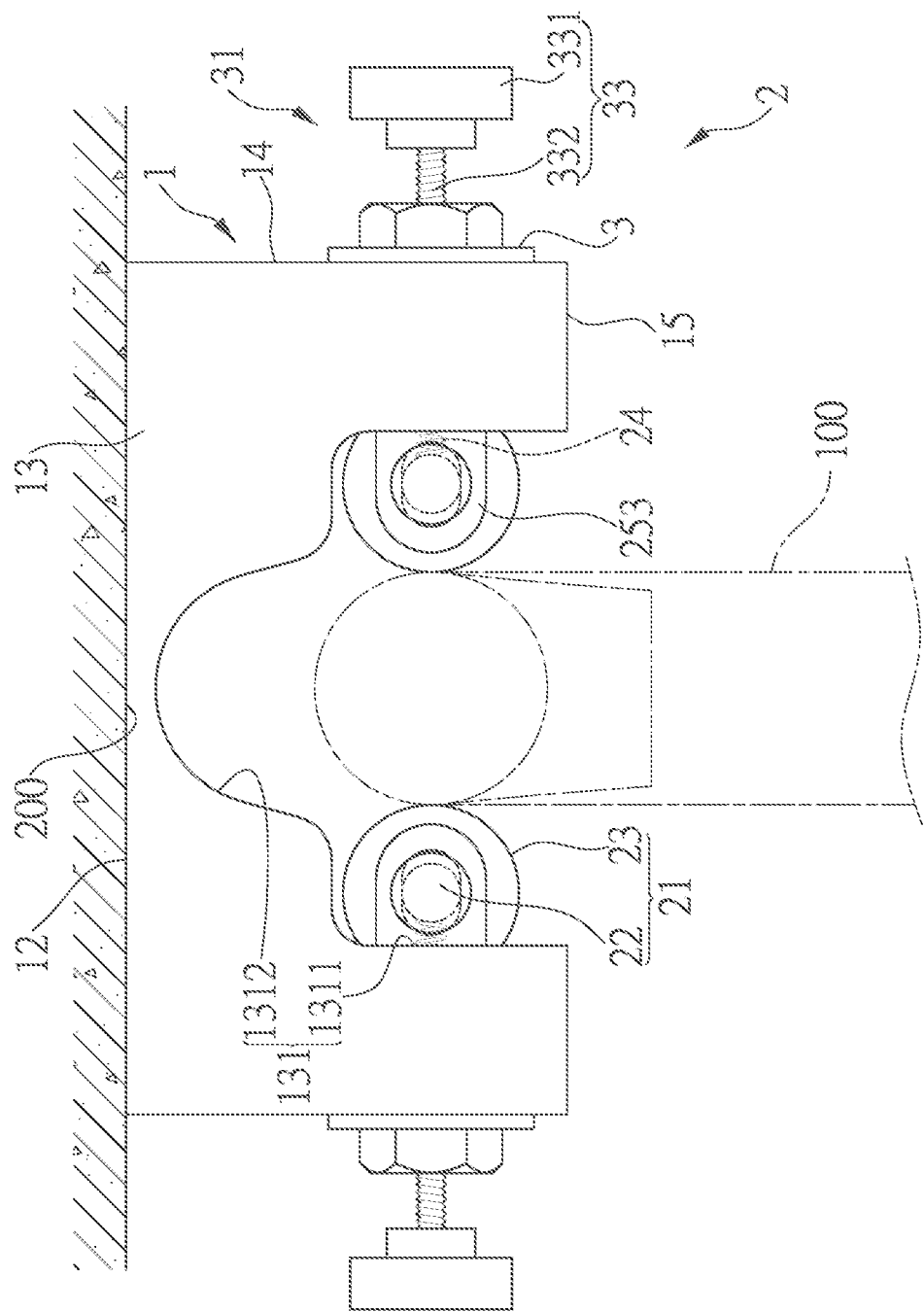
FIG. 5 shows that the bicycle wheel is inserted between the two roller units to push the two rollers away from each other.
Figure 6:
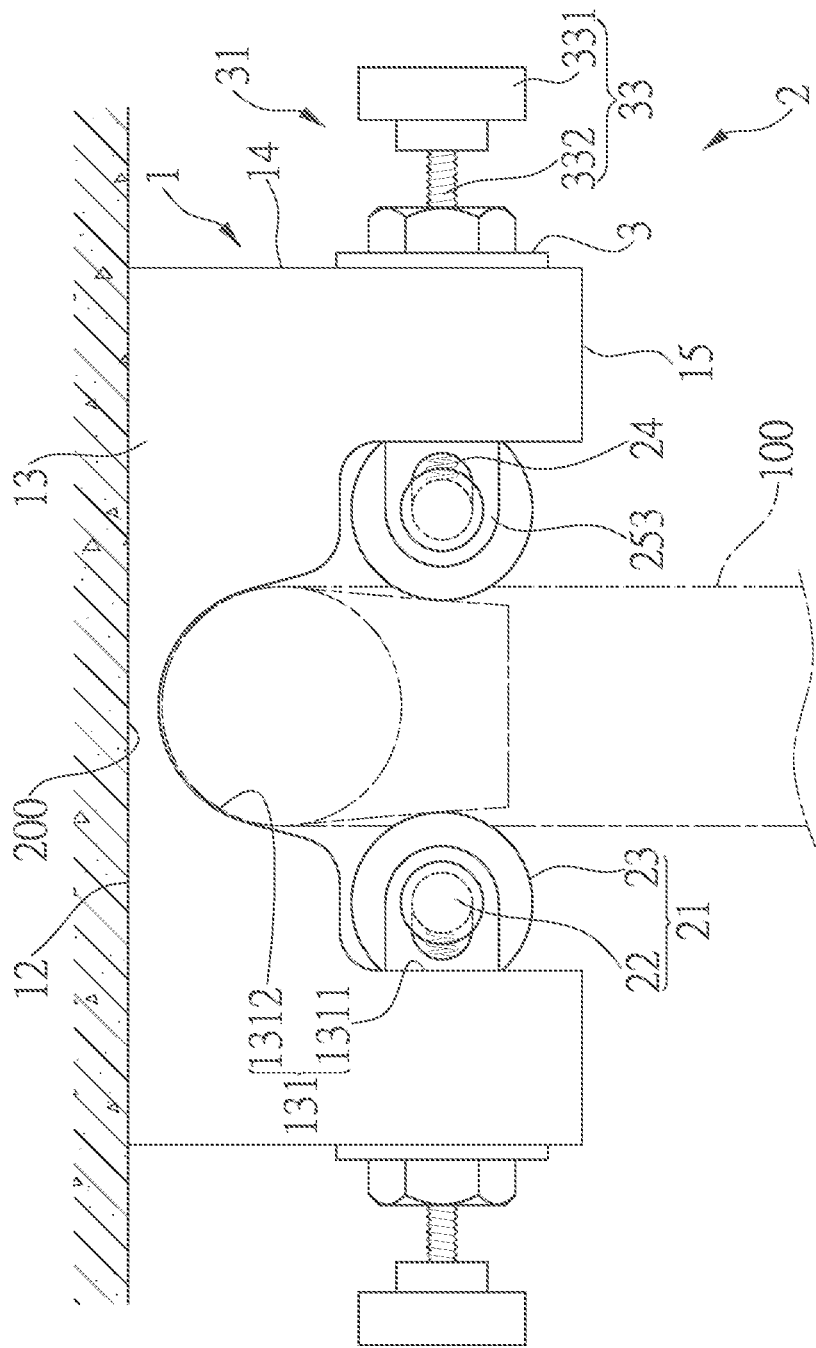
FIG. 6 shows that the bicycle wheel passes through the two roller units.
Figure 7:
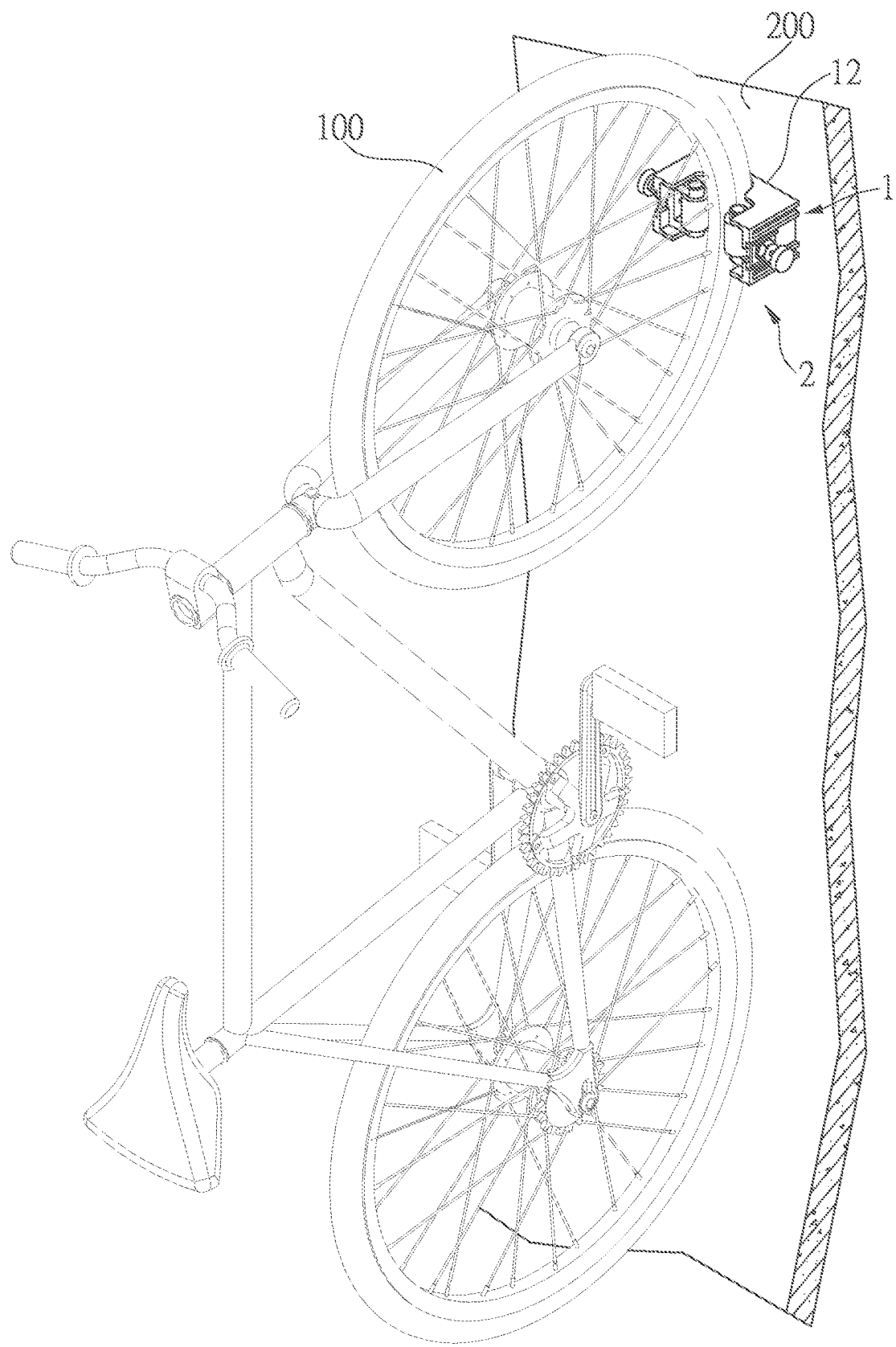
FIG. 7 shows a bicycle is parked with the front wheel positioned by the positioning device.
Figure 8:
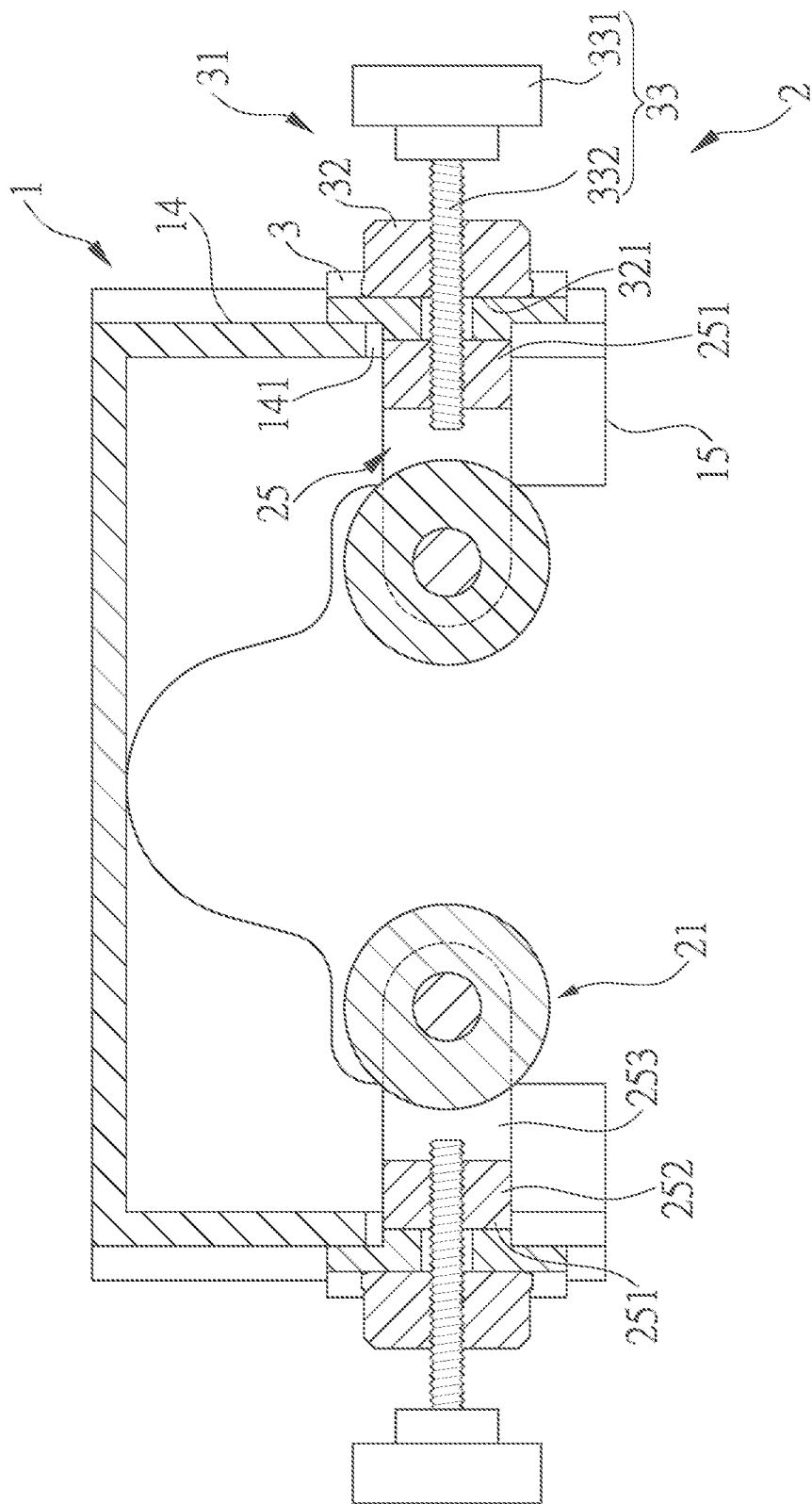
FIG. 8 is a cross sectional view, taken along line VIII-VIII in FIG. 1.

As shown in FIG. 4, the back board 12 of case 1 is fixed to a wall 200, and the bicycle wheel 100 is moved into the recesses 131 and pushed to move the two roller units 21 away from each other as shown in FIG. 5. When the bicycle wheel 100 pass the two roller units 21 as shown in FIG. 6, the two roller units 21 move back to their initial positions so as to restrict the bicycle wheel 100 from disengaging from the case 1.

Figure 12:
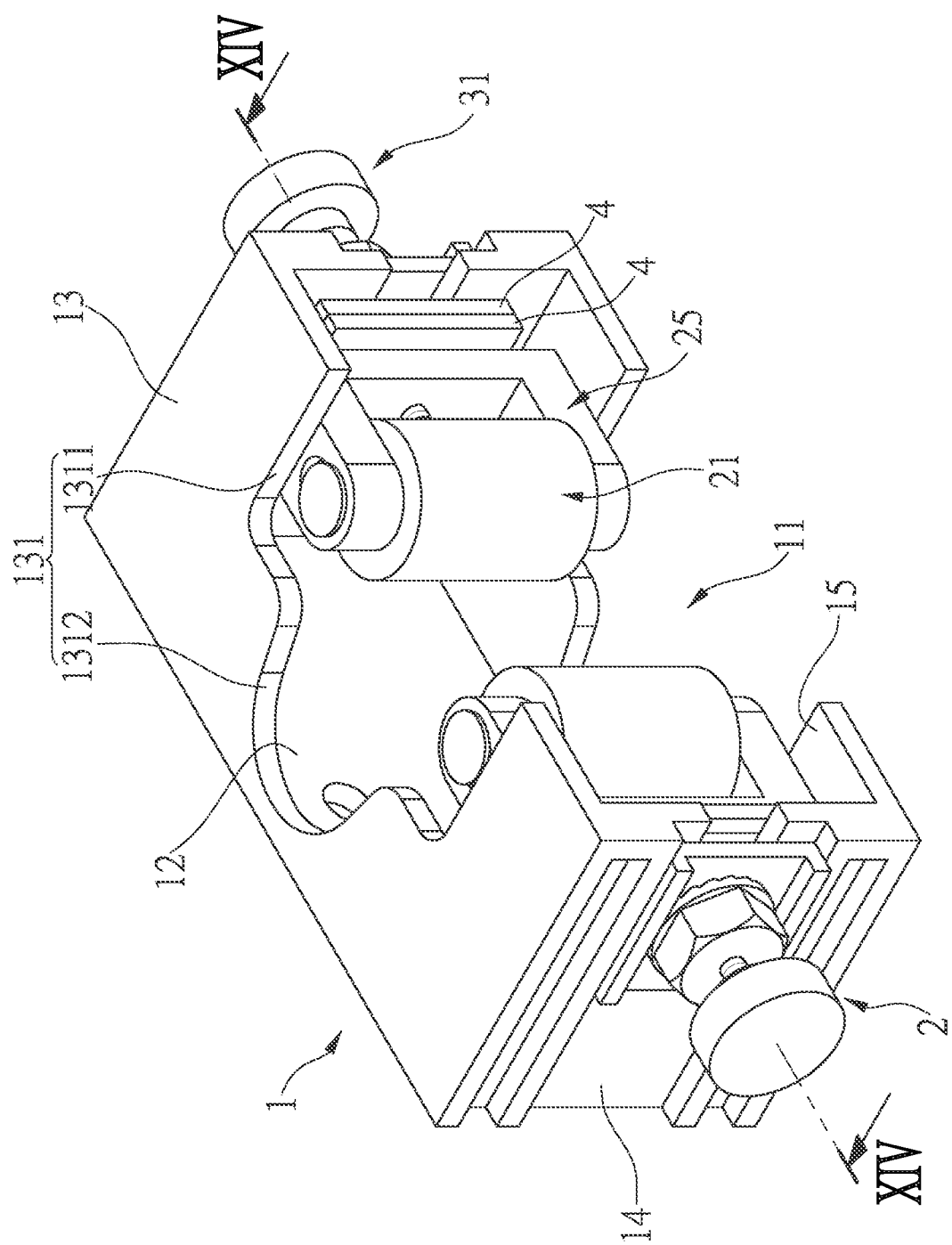
FIG. 12 is a perspective view to show that two washers are located between the second board of the case and the frame of the positioning unit.
Figure 13:
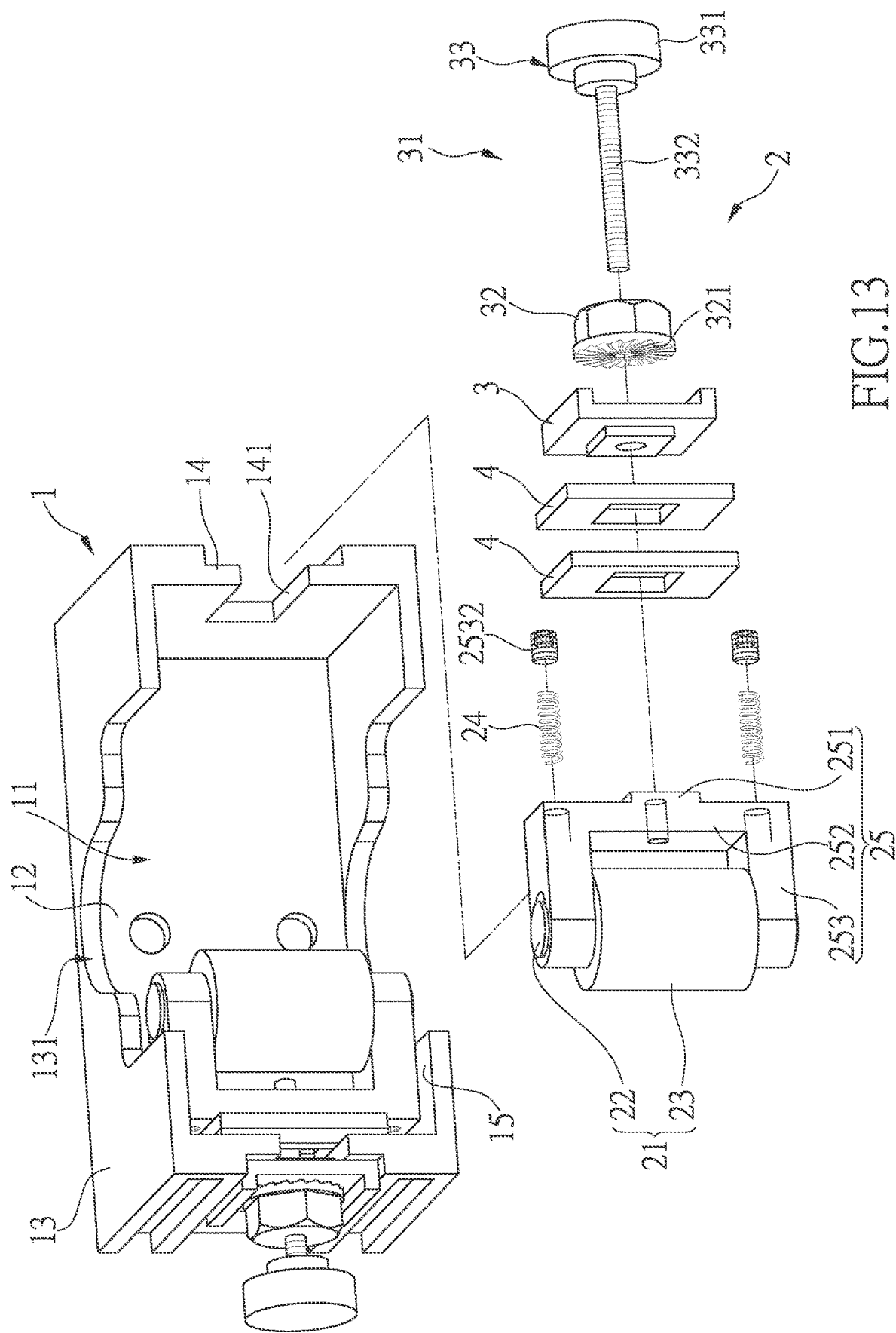
FIG. 13 is an exploded view to show that two washers are located between the second board of the case and the frame of the positioning unit.
Figure 14:
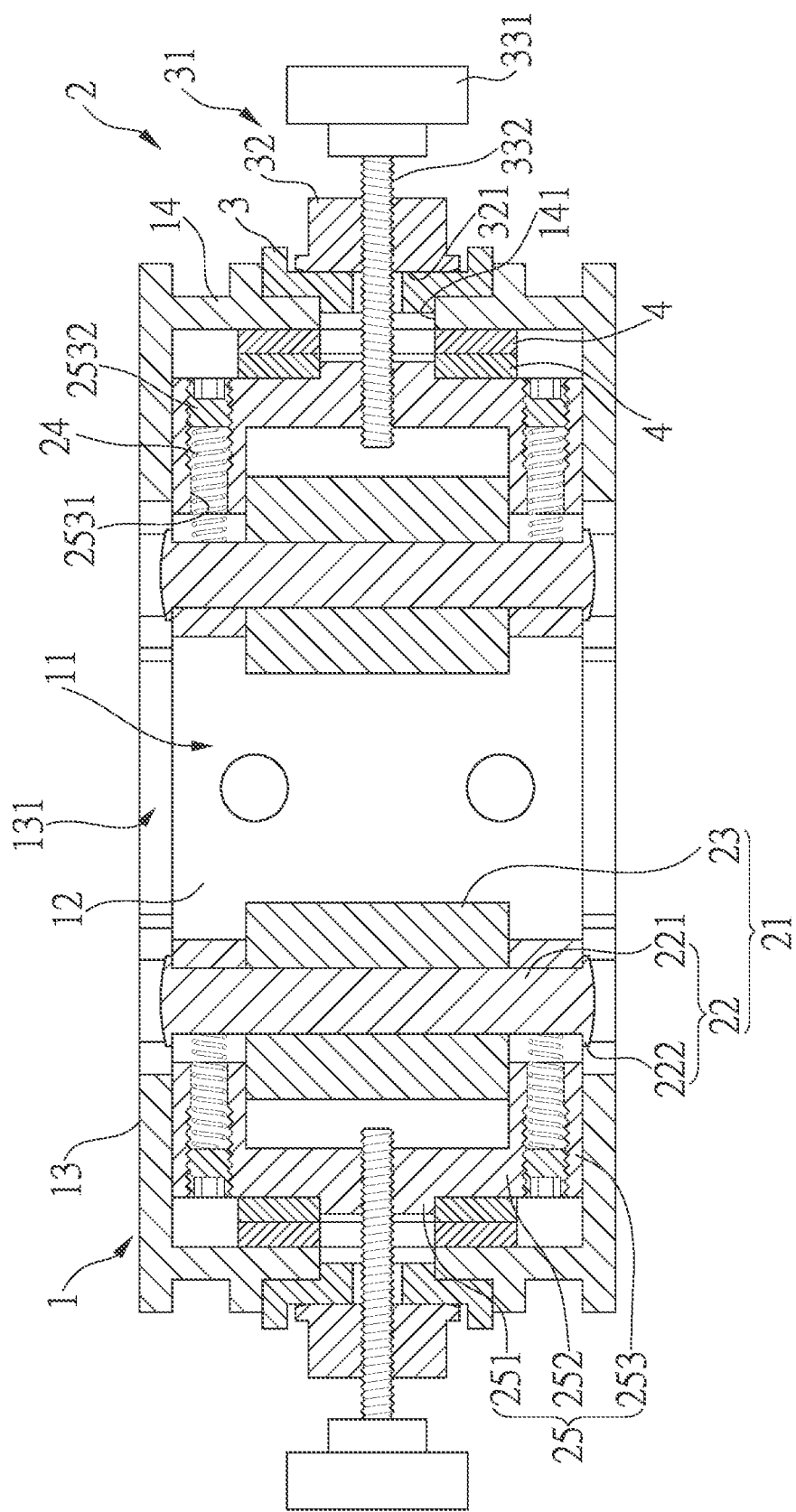
FIG. 14 is a cross sectional view, taken along line XIVI-XIV in FIG. 12.

FIGS. 12 to 14 show another embodiment, wherein each positioning unit 2 further includes two washers 4, and the two washers 4 are removably located between the second board 14 of the case 1 and the frame 25 of the positioning unit 2. The two washers 4 make the two frames 25 be close to each other so increase the force for restricting the bicycle wheel 100. The number of the washers 4 may vary according to needs.

Each of the locking units 31 includes a nut 32 and a threaded section 332. When operating the lock unit 31, the threaded section 332 extends through the nut 32, the plate 3 and the slot 141, and is connected to the frame 25. The nut 32 contacts against the outside of the plate 3 so as to clamp the second board 14 between the plate 3 and the frame 25. The locking units 31 includes a toothed face 321 that faces the plate 3 corresponding thereto so as to prevent the nut 32 from being loosened due to vibration.

Figure 2:
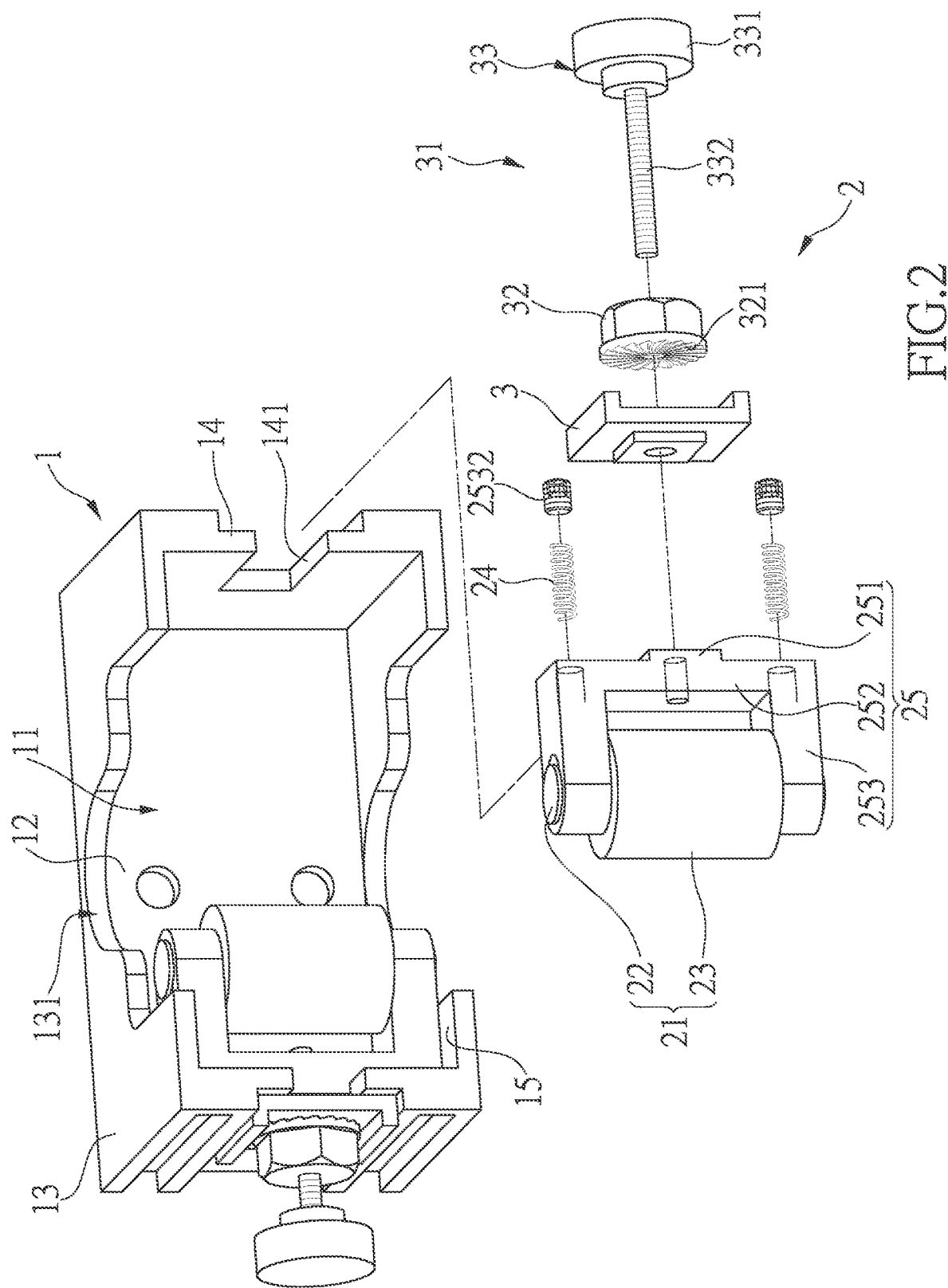
FIG. 2 is an exploded view of the positioning device of the present invention.
Figure 3:
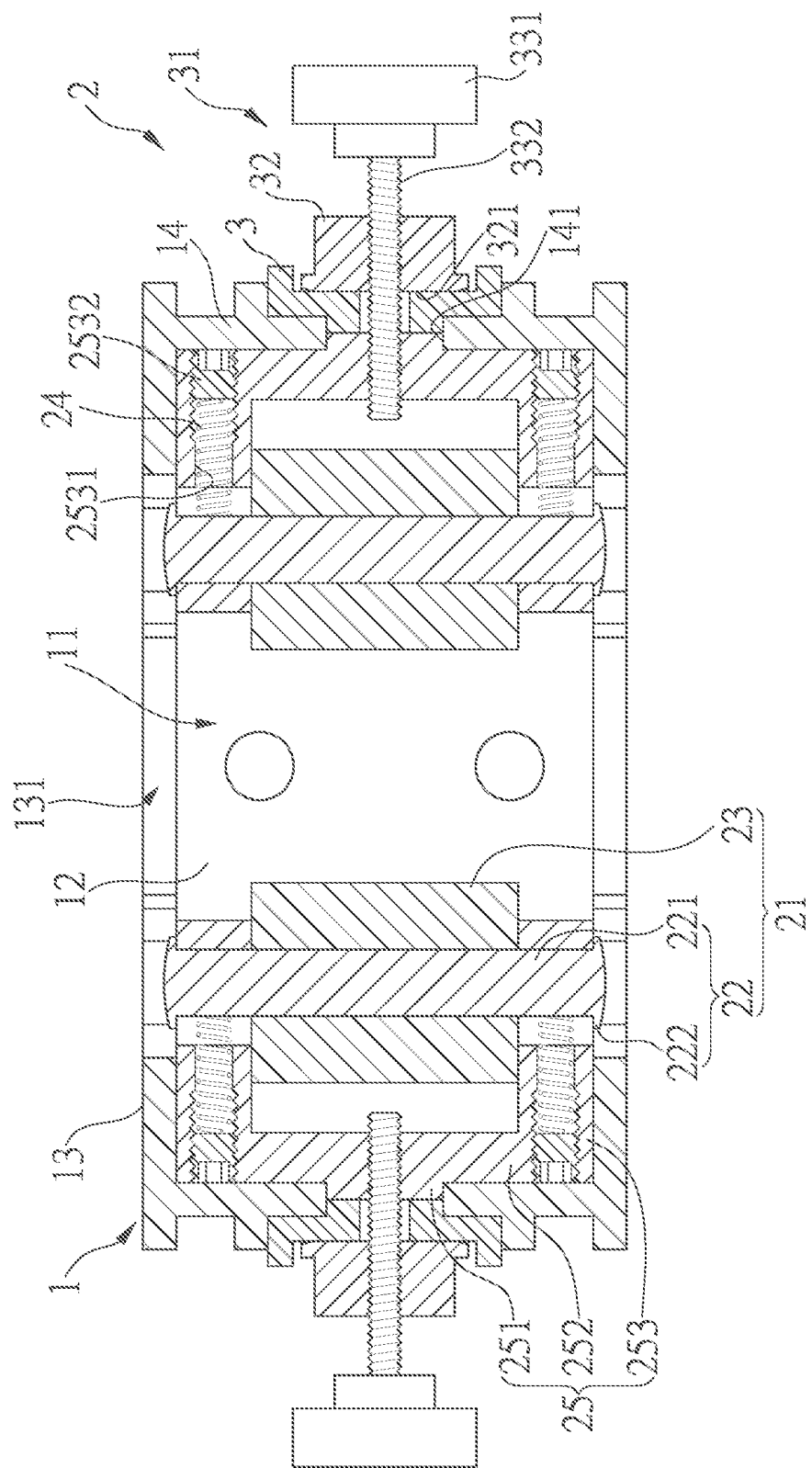
FIG. 3 is a cross sectional view, taken along line III-III in FIG. 1.
Figure 10:
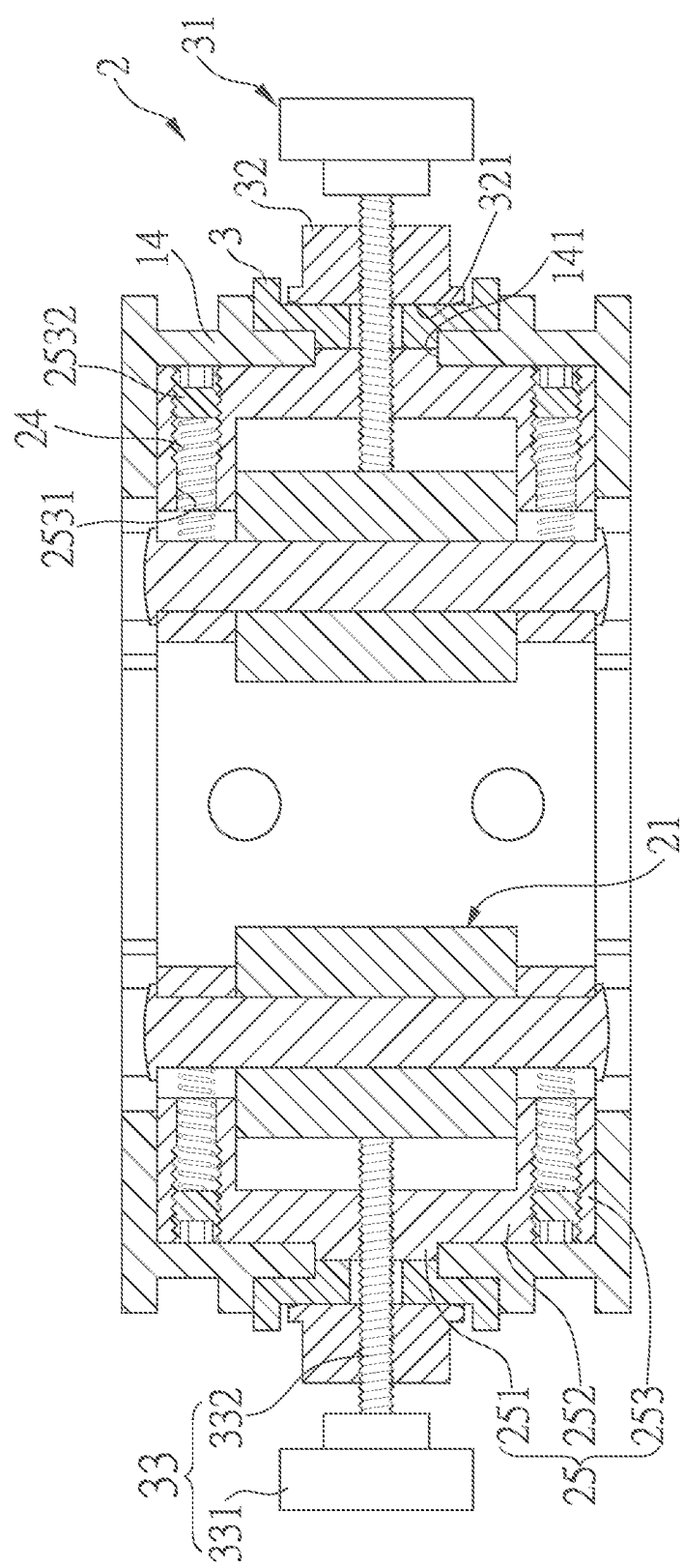
FIG. 10 shows the threaded section of the locking member contacts the roller.

Specifically, as shown in FIGS. 2, 3 and 10, each of the locking units 31 includes a locking member 33 which includes a knob 331 and the threaded section 332 extends from the knob 331. As described before, after the threaded section 332 extends through the frame 25, the threaded section 332 is movable relative to the roller unit 21 corresponding thereto by rotating the knob 331. When the distal end of the threaded section 332 contacts the roller unit 21 corresponding thereto, the roller unit 231 cannot move so that even when the bicycle is hit unintentionally, the bicycle does not separate from the positioning device of the present invention.

Figure 11:
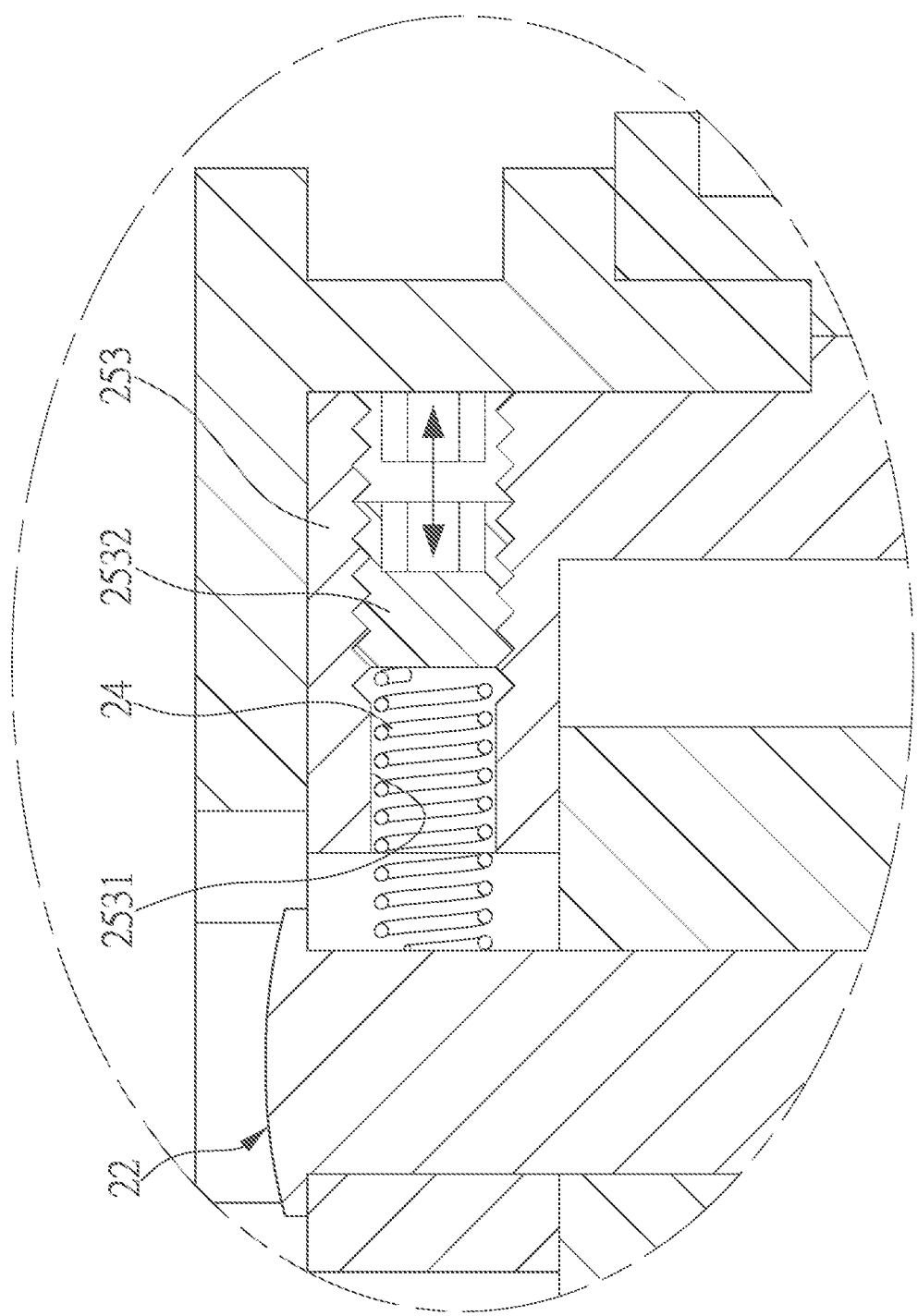
FIG. 11 shows the adjustment of the screw in the chamber of each frame.

As shown in FIGS. 2 to 6, each of the positioning units 2 includes the frame 25 and the roller unit 21, and the roller unit 21 includes a pivot 22 and a roller 23. The pivot 22 extends through the roller 23 which is rotatable about the pivot 22. The frame 25 includes a base 252 and two wings 253 respectively formed to two ends of the base 252. Two ends of the pivot 22 are respectively and rotatably connected to the two wings 253. At least one of the wings 253 includes a chamber 2531, in this embodiment, each of the two wings 253 has a chamber 2531. Each chamber 2531 has one of the two springs 24 located therein and contacts the pivot 22. As shown in FIGS. 2, 3 and 11, the chamber 2531 includes threads formed to the inner periphery thereof. A screw 2532 is located in the chamber 2531 and threadedly engaged with the threads in the chamber 2531. The spring 24 is biased between the pivot 22 and the screw 2532, so that the spring 24 does not drop from the chamber 2531, and the force that the spring 24 applies to the pivot 22 can be adjusted by rotating the screw 2532.

It is noted that, the roller 23 can also be secured to the pivot 22, and the pivot 22 is rotated relative to the wings 253.

As shown in FIG. 3, the pivot 22 includes a body section 221 and two heads 222 which are respectively formed to two ends of the body section 221. The diameter of each of the two heads 222 is larger than that of the body section 221. The two heads 222 are respectively located on outside of the two wings 253 so that the pivot 22 does not separated from the two wings 253.

Each of the recess 131 includes two first sections 1311 and a second section 1312 which extends between the two first sections 1311. The two first sections 1311 communicates with the opening 15. The width between the two first sections 1311 is wider than that of the second section 1312. The two positioning units 2 are partially located in the two first sections 1311, and the bicycle wheel 100 is first entered into the area between the two first sections 1311 via the opening 15 of the case 1, and pushes the two roller units 21.

Figure 9:
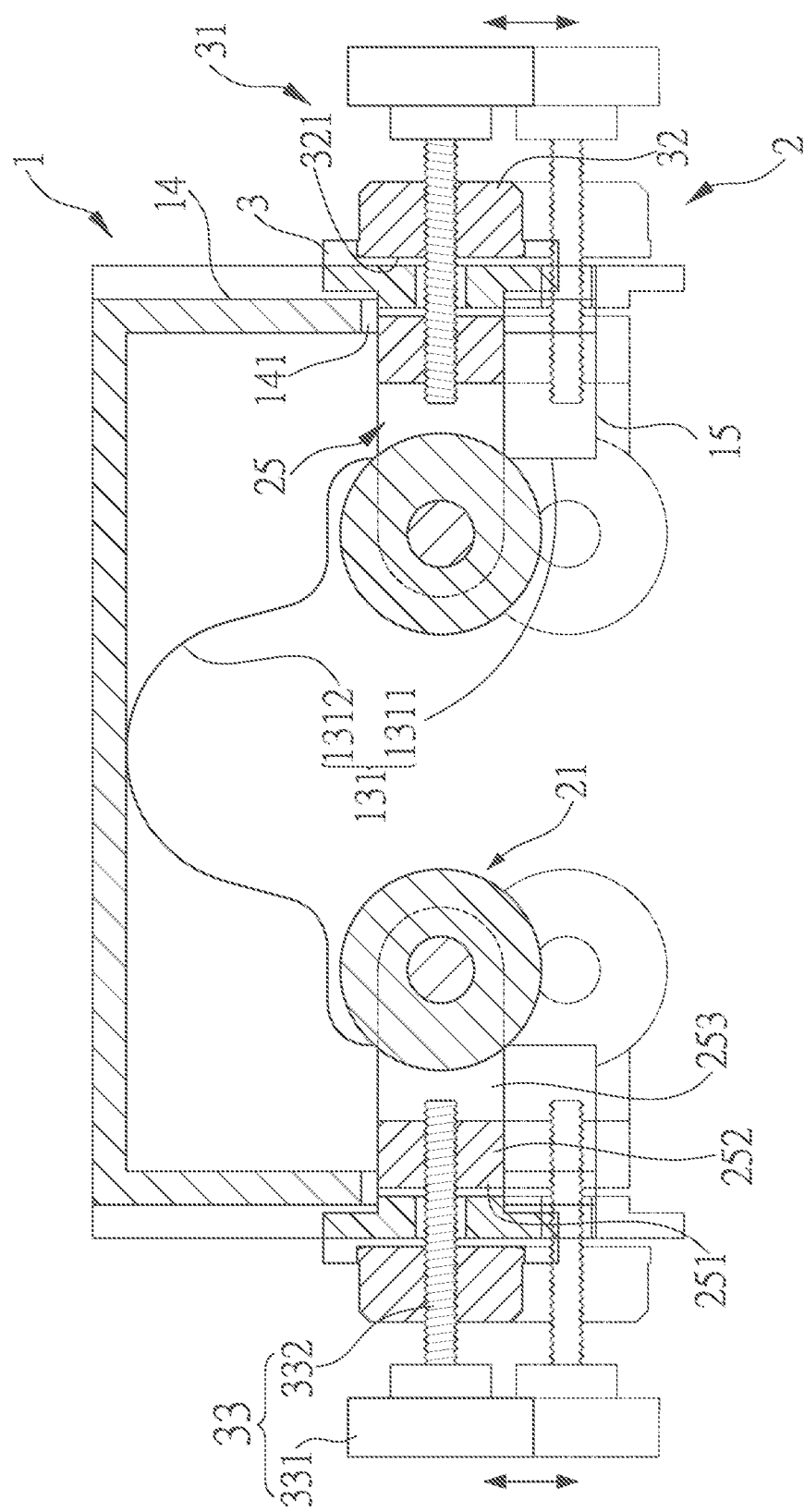
FIG. 9 shows that the positioning units are movable along the slots of the second boards.

As shown in FIGS. 2, 3, 8 and 9, each of the positioning units 2 includes a frame 25, a plate 3, a locking unit 31 and the roller unit 21. Each second board 14 includes a slot 141 which opens to the front of the case 1 and communicates with the opening 15 and the room 11. Each frame 25 is connected to the roller unit 21 and includes a protrusion 251 extending in the direction away from the roller unit 21. The protrusion 251 is located corresponding to the slot 141 of the second board 14 corresponding thereto. The plate 3 is located at the outside of the second board 14 corresponding thereto. Each of the locking units 31 secures the plate 3 and the protrusion 251 to the second board 14 which is clamped between the plate 3 and the frame 25 so that the positioning unit 2 cannot move relative to the second board 14. When the locking unit 31 is released, the positioning unit 2 is movable along the slot 141 of the second board 14 as shown in FIG. 9. It is noted that the protrusion 251 is movable in the slot 141 corresponding thereto to ensure that the frame 25 is smoothly and steadily movable along the slot 141. The adjustment of the frame 25 of each of the roller units 2J is easy by operating the locking unit 31.

The movement of the roller units 21 that are movable along the slots 141 of the second boards 14 allows the bicycle wheels 100 of different sizes to be positioned by the positioning device of the present invention.

While we have shown and described the embodiment in accordance with the present invention, it should be clear to those skilled in the art that further embodiments may be made without departing from the scope of the present invention.

What is claimed is:

1. Bicycle wheel positioning device comprising:
   a case (1) including a back board (12), two first boards (13) and two second boards (14), the two first boards (13) respectively extending from a top and a bottom of the back board (12), the two second boards (14) respectively extending from two ends of the back board (12) and connected to the two first boards (13), a room (11) formed between the back board (12), the two first boards (13) and the two second boards (14), the case (1) including an opening (15) formed to a front of the case (1) and communicating with the room (11), each of the two first boards (13) including a recess (131) which communicates with the opening (15) and the room (11), and
   two positioning units (2) respectively connected to the two second boards (14), each positioning unit (2) including a roller unit (21) and at least one spring (24), the two respective roller units (21) located in the room (11), when a force is applied to the two roller units (21) in a direction toward the two roller units (21), the at least one spring (24) of each roller unit (21) is compressed and the two roller units (21) are resiliently moved away from each other, when the force is removed, the at least one spring (24) of each roller unit (21) rebounds and the two roller units (21) move toward each other, each of the positioning units (2) including a frame (25) and the roller unit (21), the roller unit (21) including a pivot (22) and a roller (23), the Divot (22) extending through the roller (23), the frame

(25) including a base (252) and two wines (253) respectively formed to two ends of the base (252), two ends of the pivot (22) respectively and rotatably connected to the two wines (253), at least one of the wines (253) including a chamber (2531), the at least one spring (24) located in the chamber (2531) and contacting the pivot (22).

2. The bicycle wheel positioning device as claimed in claim 1, wherein each of the positioning units (2) includes a frame (25), a plate (3), a locking unit (31) and the roller unit (21), each second board (14) includes a slot (141) which opens to the opening (15) and the room (11), each frame (25) is connected to the roller unit (21) and includes a protrusion (251) extending in a direction away from the roller unit (21), the protrusion (251) is located corresponding to the slot (141) of the second board (14) corresponding thereto, the plate (3) is located at an outside of the second board (14) corresponding thereto, each of the locking units (31) secures the plate (3) and the protrusion (251) to the second board (14) which is clamped between the plate (3) and the frame (25) so that the positioning unit (2) cannot move relative to the second board (14), when the locking unit (31) is released, the positioning unit (2) is movable along the slot (141) of the second board (14).

3. The bicycle wheel positioning device as claimed in claim 2, wherein each of the locking units (31) includes a nut (32) and a threaded section (332) which extends through the nut (32), the threaded section (332) extends through the plate (3) and the slot (141), and is connected to the frame (25), the nut (32) contacts against an outside of the plate (3).

4. The bicycle wheel positioning device as claimed in claim 3, wherein the nut (32) of each of the locking units (31) includes a toothed face (321) that faces the plate (3) corresponding thereto.

5. The bicycle wheel positioning device as claimed in claim 2, wherein each of the locking units (31) includes a locking member (33) which has a knob (331) and a threaded section (332) connected to the knob (331), the threaded section (332) is movable relative to the roller unit (21) corresponding thereto, when a distal end of the threaded section (332) contacts the roller unit (21) corresponding thereto, the roller unit (231) cannot move.

6. The bicycle wheel positioning device as claimed in claim 1, wherein the chamber (2531) includes threads formed to an inner periphery thereof, a screw (2532) is located in the chamber (2531) and threadedly engaged with the threads in the chamber (2531), the at least one spring (24) is biased between the pivot (22) and the screw (2532).

7. The bicycle wheel positioning device as claimed in claim 1, wherein the roller (23) is rotated about the pivot (22) extending therethrough, each positioning unit (2) further includes a locking unit (31) and at least one washer (4), the frame (25) is connected to the second board (14) of the case (1) by the locking unit (31), the at least one washer (4) is removably located between the second board (14) of the case (1) and the frame (25) of the positioning unit (2).

8. The bicycle wheel positioning device as claimed in claim 1, wherein the pivot (22) includes a body section (221) and two heads (222) which are respectively formed to two ends of the body section (221), a diameter of each of the two heads (222) is larger than that of the body section (221), the two heads (222) are respectively located on an outside of the two wings (253).

9. The bicycle wheel positioning device as claimed in claim 1, wherein each of the recess (131) includes two first sections (1311) and a second section (1312) which extends between the two first sections (1311), the two first sections (1311) communicates with the opening (15), the two positioning units (2) are partially located in the two first sections (1311).

* * * * *